(12) United States Patent
Fouladi Fard et al.

(10) Patent No.: US 11,804,852 B2
(45) Date of Patent: Oct. 31, 2023

(54) SYSTEM AND METHOD FOR MITIGATING EFFECTS OF HASH COLLISIONS IN HARDWARE DATA COMPRESSION

(71) Applicant: Eidetic Communications Inc., Calgary (CA)

(72) Inventors: Saeed Fouladi Fard, Calgary (CA); Sean Gibb, Calgary (CA)

(73) Assignee: Eidetic Communications Inc., Calgary (CA)

( * ) Notice: Subject to any disclaimer, the term of this patent is extended or adjusted under 35 U.S.C. 154(b) by 268 days.

(21) Appl. No.: 17/465,147

(22) Filed: Sep. 2, 2021

(65) Prior Publication Data

US 2023/0060654 A1  Mar. 2, 2023

(51) Int. Cl.
| | | |
|---|---|---|
| *H03M 1/36* | (2006.01) |
| *H03M 7/30* | (2006.01) |
| *G06F 16/901* | (2019.01) |
| *G06F 30/331* | (2020.01) |
| *H03M 7/42* | (2006.01) |
| *H04L 9/06* | (2006.01) |

(52) U.S. Cl.
CPC ...... *H03M 7/3084* (2013.01); *G06F 16/9014* (2019.01); *G06F 16/9017* (2019.01); *G06F 30/331* (2020.01); *H03M 7/42* (2013.01); *H03M 7/6023* (2013.01); *H04L 9/0643* (2013.01)

(58) Field of Classification Search
CPC ... H03M 7/3084; H03M 7/42; G06F 16/9014; G06F 16/9017; G06F 30/331; H04L 9/0643
See application file for complete search history.

(56) References Cited

U.S. PATENT DOCUMENTS

2019/0065494 A1\* 2/2019 Abali ............... G06F 16/2255

\* cited by examiner

*Primary Examiner* — Joseph J Lauture
(74) *Attorney, Agent, or Firm* — BORDEN LADNER GERVAIS LLP; Curtis Behmann

(57) ABSTRACT

Systems and methods are provided for mitigating effects of hash collisions in hardware data compression, for example reducing or avoiding the side effects of hash collisions, or reducing or avoiding slow downs caused by hash collisions. In an aspect, a processor-implemented method includes: hashing an input data byte sequence to produce a hash value, the input data byte sequence being located at a sequence address within an input data stream; and storing, in a hash table at a hash address corresponding to the hash value, the sequence address and a portion of the input data byte sequence. In an aspect, to further avoid hash collisions, hash memory accesses are distributed among a plurality of parallel hash banks to increase the throughput. Another aspect virtually extends a hash depth by extending a data match search around broken hash links, going backward in the data sequence.

19 Claims, 6 Drawing Sheets

```
                    *+          +
                    0000000000111111111122222222223333333333444444444455555555556
Address in Memory:  0123456789012345678901234567890123456789012345678901234567890123456

Input text:         'The search and replace ste seatingpression algorithms the seating dude'
                    ==========                               ========== q  = 3        # Hash is generated for every 3 bytes
n  = 10       # Number of hash bits
T  = 2**n = 1024   # hash table entries

Hash function definition (native)

hash(x) = sum(x) mod 1024

Example hash operation:

hash('The') = hash((84, 104, 101)) = sum((84, 104, 101)) = 289 mod 1024 = 289

--> Put address=00 (* which points to 'The') in location 289 of hash table      put [289, 'T'] in hash table hash('he ') = hash((104, 101, 32)) = sum((104, 101, 32)) = 237 mod 1024 = 237

--> Put address=01 (+which points to 'he ') in location 237 of hash table       put [237, 'h'] in hash table
```

FIG. 2

SYSTEM AND METHOD FOR MITIGATING EFFECTS OF HASH COLLISIONS IN HARDWARE DATA COMPRESSION

FIELD

The present disclosure relates to data compression, including but not limited to computing platforms, methods, and storage media for mitigating effects of hash collisions in hardware data compression.

BACKGROUND

Data compression is used in both software and hardware environments to modify or encode information using fewer bits than the original representation. This can be helpful in many implementations, including in data centers, where exponential growth in data volumes is increasing demands for one or more of: higher storage capacity, higher communication bandwidth, higher power consumption and larger real estate.

High performance lossless data compression, however, is a computationally intensive problem. Implementing a hardware data compression circuit can increase the data processing speed compared to software solutions. However, efficient hardware implementation of compression algorithms, including Deflate, proves challenging since they involve sequential operations like search, sort, and entropy coding.

Data compression involving a hash table can produce hash collisions where a hash algorithm produces the same hash value for two different input sequences. The effects of the hash collisions can adversely affect data compression effectiveness and speed.

Improvements in approaches for mitigating effects of hash collisions in hardware data compression are desirable.

SUMMARY

One aspect of the present disclosure relates to a processor-implemented method of mitigating effects of hash collisions in hardware data compression, comprising: hashing an input data byte sequence to produce a hash value, the input data byte sequence being located at a sequence address within an input data stream; and storing, in a hash table at a hash address corresponding to the hash value, the sequence address and a portion of the input data byte sequence.

Another aspect of the present disclosure relates to a processor-implemented method of detecting hash collisions for data compression in hardware, comprising: hashing an input data byte sequence to produce a hash value, the input data byte sequence being located at a sequence address within an input data stream; storing, in a hash table at a hash address corresponding to the hash value, a current hash data pair comprising the sequence address and a portion of the input data byte sequence; comparing the current hash data pair to a plurality of stored hash data pairs; and detecting a hash collision in response to a mismatch resulting from a comparison of the current hash data pair with the plurality of stored hash data pairs.

A further aspect of the present disclosure relates to a processor-implemented method of detecting hash collisions for data compression in hardware, comprising: obtaining a current hash data pair associated with a hash address corresponding to a hash value, the hash value produced by hashing an input data byte sequence, the current hash data pair comprising i) a sequence address of the input data byte sequence; and ii) a portion of the input data byte sequence; comparing the current hash data pair to a plurality of stored hash data pairs; and detecting a hash collision in response to a mismatch resulting from a comparison of the current hash data pair with the plurality of stored hash data pairs.

Another aspect of the present disclosure relates to a processor-implemented method of mitigating effects of hash collisions in hardware data compression, comprising: hashing an input data byte sequence to produce a hash value, the input data byte sequence having q input bytes and p initial bits; selecting, based on the p initial bits, a selected hash storage bank from among a plurality of hash storage banks; and storing, in the selected hash storage bank, the hash value.

A further aspect of the present disclosure relates to a processor-implemented method of mitigating effects of hash collisions in hardware data compression, comprising: dividing a hash memory into a plurality PP of parallel independent storage banks; hashing an input data byte sequence to produce a hash value, the input data byte sequence having q input bytes and p initial bits; selecting, based on the p initial bits, a selected hash storage bank S from among the plurality PP of parallel independent storage banks; and storing, in the selected hash storage bank S, the hash value.

Another aspect of the present disclosure relates to a processor-implemented method of mitigating effects of hash collisions in hardware data compression, comprising: obtaining an input data byte sequence; randomizing the input data byte sequence using a permutation index to produce a randomized input data byte sequence; hashing the randomized input data byte sequence to produce a randomized hash value; and storing, in a hash table, the randomized hash value.

A further aspect of the present disclosure relates to a processor-implemented method of mitigating effects of hash collisions in hardware data compression, comprising: hashing an input data byte sequence to produce a hash value; randomizing the hash value using a permutation index to produce a randomized hash value different from a previous permutation index; and storing, in a hash table, the randomized hash value.

Yet another aspect of the present disclosure relates to a processor-implemented method of performing a hash lookup for data compression in hardware, comprising: obtaining, for a set of bits in an input data byte sequence, a corresponding set of hash distances; analyzing the set of hash distances to identify a different hash distance occurring in a series of identical hash distances; determining that a second hash sequence has overwritten a first hash sequence based on identifying at least one additional occurrence of the identical hash distance; and extending a data match search to a hash distance associated with the first hash sequence to extrapolate information in hashes in the presence of a hash interruption.

A further aspect of the present disclosure relates to a system for mitigating effects of hash collisions in hardware data compression, comprising: a non-transient computer-readable storage medium having executable instructions embodied thereon; and one or more hardware processors configured to execute the instructions to perform any one of the methods described and illustrated herein.

Another aspect of the present disclosure relates to a non-transient computer-readable storage medium having instructions embodied thereon, the instructions being executable by one or more processors to perform any one of the methods described and illustrated herein.

BRIEF DESCRIPTION OF THE DRAWINGS

Embodiments of the present disclosure will now be described, by way of example only, with reference to the attached Figures.

FIG. 2 illustrates an example input data byte sequence and associated operations relating to the embodiment illustrated in FIG. 1.

DETAILED DESCRIPTION

Figure 1:
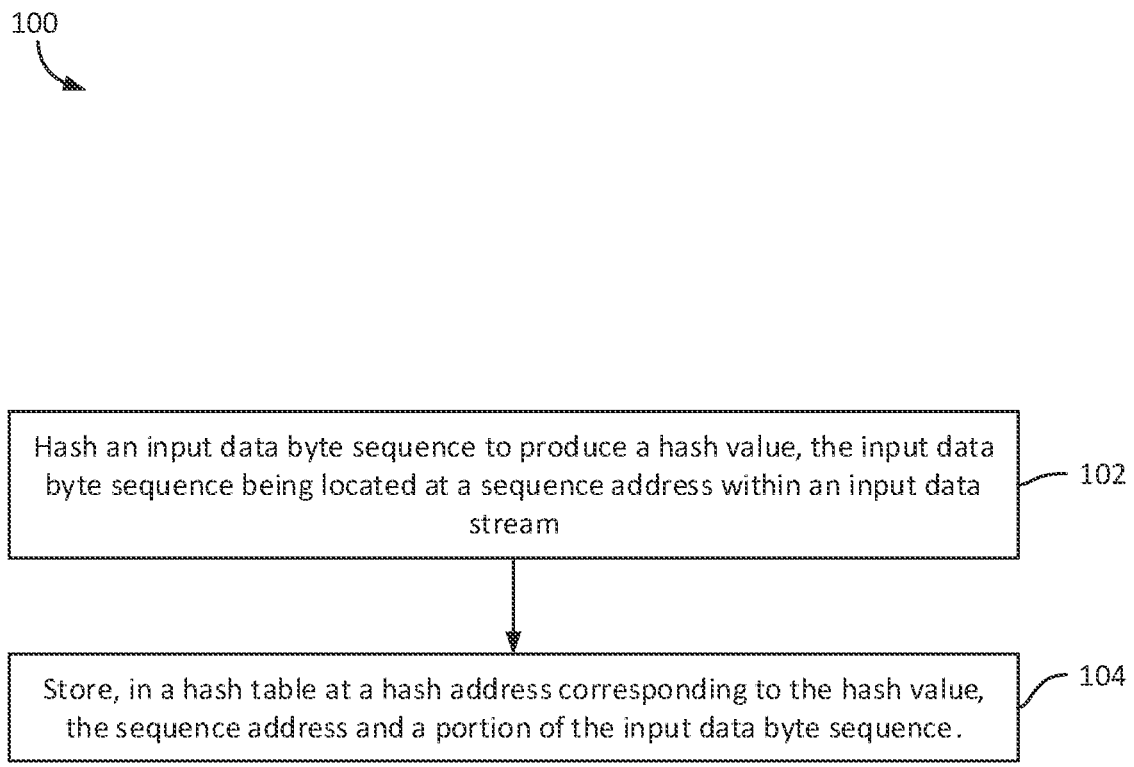
FIG. 1 is a flowchart illustrating a processor-implemented method of mitigating effects of hash collisions in hardware data compression according to an embodiment of the present disclosure.

Systems and methods are provided for mitigating effects of hash collisions in hardware data compression, for example reducing or avoiding the side effects of hash collisions, or reducing or avoiding slow downs caused by hash collisions. In an aspect, a processor-implemented method includes: hashing an input data byte sequence to produce a hash value, the input data byte sequence being located at a sequence address within an input data stream; and storing, in a hash table at a hash address corresponding to the hash value, the sequence address and a portion of the input data byte sequence. In an aspect, to further speed up hash table access, hash memory accesses are distributed among a plurality of parallel hash banks to increase the throughput. Another aspect virtually extends a hash depth by extending a data match search around broken hash links, going backward in the data sequence.

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

Certain terms used in this application and their meaning as used in this context are set forth in the description below. To the extent a term used herein is not defined, it should be given the broadest definition persons in the pertinent art have given that term as reflected in at least one printed publication or issued patent. Further, the present processes are not limited by the usage of the terms shown below, as all equivalents, synonyms, new developments and terms or processes that serve the same or a similar purpose are considered to be within the scope of the present disclosure.

Lossless data compression, for example in data centers, is becoming more important due to exponential growth in data volumes. Moreover, data size increases put pressure on existing data centers by increasing demands for one or more of the following to accommodate the resulting hardware and higher costs: higher storage capacity, higher communication bandwidth, higher power consumption, larger real estate. Data compression can effectively address these problems by reducing the amount of data. For instance, a 3 to 1 compression could result in three times less data storage capacity requirements and three times quicker data transfers over the network. Moreover, a 3 to 1 compression ratio means data centers could not only leverage the capacity and extend the life of their existing storage, but also boost the output speed of their storage devices by a factor of three.

High performance lossless data compression, however, is a computationally intensive problem. Lossless data compression algorithms (like Deflate) typically include a search and replace part and an entropy coding part. In Deflate (RFC 1951), the search and replace part is handled by the LZ77 algorithm, and the Huffman algorithm is used for entropy coding. In Deflate, to get a high compression ratio, the LZ77 algorithm needs to perform many searches to find potential matches to replace; these searches most often return without useful results. Trying to increase the compression ratio, usually through higher compression levels, increases the number of searches exponentially. This low yield search stage makes compression a very computationally intensive task.

Implementing a hardware data compression circuit can increase the data processing speed compared to software solutions. Such hardware implementations can target either application-specific integrated circuits (ASICs) or field programmable gate array (FPGA) devices. However, efficient hardware implementation of compression algorithms, including Deflate, proves challenging since they involve sequential operations like search, sort, and entropy coding.

Embodiments of the present disclosure provide methods and systems to increase the efficiency of data compression in hardware. According to some embodiments described herein, the Deflate algorithm (used in common ZLIB and GZIP programs) is used as an example to illustrate the embodiments. According to other embodiments of the present disclosure, the same approaches described herein can be applied to implementation of different compression methods or algorithms.

The search and replace step in compression algorithms often yields the lion's share of compression in most cases. In this step, repeated strings of data are replaced with a pair which indicates the distance and length of a match. To limit the implementation complexity, the search is often performed on a limited window (W bytes) of a previous data stream. The maximum size of this window is set in advance, but the actual value is often less than that maximum size, depending on availability of memory resources. LZ77 is a common search and replace algorithm which is used in several compression programs including ZLIB and GZIP, operating on an up-to W=32768-byte window.

The first step in the search and replace algorithm is locating repeated strings. Direct implementation of a string search is impractical for most file sizes due to exponential growth in the number of possible patterns which need to be searched. Instead, most compression programs use data hashing to locate possible matches. Usually, an n-bit hash, H, is generated for a sequence of q=2, 3, . . . input data bytes.

This hash value is then used as a memory address to a hash-table which stores the actual address in the data stream where this hash H was encountered. Later in the sequence, if another sequence of q bytes in the data stream results in the same hash value H, one can read the hash-table content at H and locate the previous point in the data stream where a possible match could exist. The two locations in the data stream can then be compared to find the actual length of the match.

The number of entries in a hash table T is determined by the number of used hash bits n and can be calculated as $T=2^n$. Due to memory limitations, in most applications n is bounded to a manageable value, typically between 10 to 16. This often results in hash collisions, which happen when two different strings of length q result in the same hash, or hash value. Note that hash collisions cannot be avoided when $n<8*q$, which is the case in most implementations.

When a hash collision happens, the compare algorithm returns a mismatch or a match of length=0. Moreover, a hash table entry may point to a string which is outside of the search and replace window. In this case, the compare algorithm also returns a mismatch.

In a hardware implementation, comparing two data locations for potential matches is often a major bottleneck to throughput, as it involves fetching data from random locations of the data stream. To improve the throughput, it is important to minimize the number of times where the compare circuit comes back with mismatches.

Another issue in a hardware implementation of compression algorithms is how to clear the hash table efficiently between subsequent compression jobs or operations. If the hash table is not cleared between jobs, the hash values left over from a previous job can falsely report potential matches which do not exist. This is especially problematic when back-to-back jobs have similar contents. In this case, the compare circuit can waste a lot of time looking for non-existing matches. Clearing the hash table on the other hand can be costly as it takes precious clock cycles to clear every entry in the table.

Embodiments of the present disclosure will now be described which provide new methods, systems and approaches to speed up the compression process by reducing the workload of the search and compare parts of compression, and to mitigate effects of hash collisions.

FIG. 1 is a flowchart illustrating a processor-implemented method of 100 mitigating effects of hash collisions in hardware data compression according to an embodiment of the present disclosure. Mitigating effects of hash collisions may include reducing or avoiding the side effects of hash collisions, or reducing or avoiding slow downs caused by hash collisions. In the example embodiment described in relation to FIG. 1 and FIG. 2, one or more of the first few bytes of a hashed data sequence are stored along with the data address in the hash table.

FIG. 2 illustrates an example input data byte sequence and associated operations relating to the embodiment illustrated in FIG. 1. As shown in FIG. 2, an input data byte sequence, such as input text, includes a string of characters, with each character mapped to a specific address in memory. In this example, the input data byte sequence comprises the following text string:

'The search and replace ste seatingpression algorithms the seating dude'.

In the example embodiment of FIG. 2, a hash is generated for every 3 bytes, i.e. q=3, and the number of hash bits is n=10. The number of hash table entries can be defined by $T=2**n=1024$.

Consider an example implementation hashing the first 3 bytes ("The") of the input data byte sequence. With reference to FIG. 1, and to the example in FIG. 2, a processor-implemented method according to an embodiment of the present disclosure includes, in FIG. 1 at 102, hashing an input data byte sequence ("The") to produce a hash value ("289"). The hash value of "289" is calculated in this implementation using the example hash function hash (x)=sum(x) mod 1024. In this case, that results in:

$$\text{Hash ('The')} = \text{hash } ((84, 104, 101)) \text{ based on } ASCII \text{ codes associated with the characters "}T\text{", "}h\text{" and "}e\text{"}$$
$$= \text{sum } ((84, 104, 101))$$
$$= 289 \text{ mod } 1024$$
$$= 289$$

The input data byte sequence is located at a sequence address ("00") within an input data stream as shown in FIG. 2. The method further includes, in FIG. 1 at 104, storing, in a hash table at a hash address corresponding to the hash value ("289"), the sequence address ("00") and a portion of the input data byte sequence (e.g. a portion of "The"). In other words, the method puts the address "00", which points to 'The', in location 289 of the hash table. In an example embodiment in which the portion of the input data byte sequence comprises only one byte or character, for example the first character, the method puts [289, 'T'] in the hash table.

Following the same method, the next window of 3 bytes, i.e. 'he' is hashed. In this example, the input data byte sequence comprises the characters "h" and "e" followed by a space " ". In this case, that results in:

$$\text{Hash ('he')} = \text{hash } ((104, 101, 32)) \text{ based on } ASCII \text{ codes associated with the characters "}h\text{", "}e\text{" and " "}$$
$$= \text{sum } ((104, 101, 32))$$
$$= 237 \text{ mod } 1024$$
$$= 237$$

Since this specific input data byte sequence is located at a sequence address ("01") within the input data stream, the method further includes, based on FIG. 1 at 104, storing, in a hash table at a hash address corresponding to the hash value ("237"), the sequence address ("01") and a portion of the input data byte sequence ("he"). In other words, the method puts the address "01", which points to 'he', in location 237 of the hash table. In an example embodiment in which the portion of the input data byte sequence comprises only one byte or character, for example the first character, the method puts [237, 'h' ] in the hash table.

In an example embodiment, the hardware has a memory width and a memory depth. For example, a known memory is 1024 bits deep and 36 bits wide. In an example embodiment, the method further comprises: storing the hash value in the hardware so as to add content in the memory depth; and storing the portion of the input data byte sequence in the hardware so as to add content in the memory width. For example, the hash value builds on, and is stored in, the memory depth. The portion of the input data byte sequence builds on, and is stored in, the memory width, so that it does not add to the memory depth.

In another example embodiment, the memory width includes an addressing width used with respect to addressing a window size for dictionary based compression. In one example implementation, a 10 bit hash uses up an addressing width of 10 address bits to cover a depth of 1024. In an example embodiment, the method further comprises: storing the portion of the input data byte sequence in an unused section of the memory width. The unused section is defined by the memory width minus the addressing width. For example, if the memory width is 36 bits, and a width of only 15 bits is needed for addressing a 32768 byte window, then the unused section is 21 bits (36 minus 15), and the portion of the input data byte sequence can take up some or all of that unused 21 bits. In another implementation, addresses which fit in a RAM that has a depth of 1024 are 15 bits wide to address up to a 32,768 byte window so no unused bits will be available to store a portion of the input data byte sequence.

It is worth noting that the unused bits, which are available in the memory width but unused for the addressing width, are otherwise wasted memory space using known approaches, but are leveraged according to embodiments of the present disclosure. Moreover, each wasted bit in the memory width is multiplied by the memory depth. So, for a depth of 1024, then 21 wasted bits is 21x1024 wasted bits across the width and depth of the RAM.

In an example embodiment, the portion of the input data byte sequence has a maximum length equal to a width of the unused section of the memory width. In an example embodiment, the portion of the input data byte sequence has a minimum length of 1 bit.

In another embodiment, the present disclosure provides a processor-implemented method of detecting hash collisions for data compression in hardware. This method employs a hash data pair, including the sequence address of the input data byte sequence, and a portion of the input data byte sequence. In such an embodiment, a stored portion of the hashed contents is used to detect a collision, by comparing a current hash data pair to a plurality of stored hash data pairs. This builds on the embodiment described in relation to FIG. 1 and FIG. 2 by providing an example of how the hash address and the portion of the input data byte sequence can be used to detect hash collisions.

Described in relation to the example embodiment of FIG. 2, the method according to this other embodiment of the present disclosure comprises: hashing an input data byte sequence ("The") to produce a hash value ("289"), the input data byte sequence being located at a sequence address ("00") within an input data stream; storing, in a hash table at a hash address corresponding to the hash value ("289"), a current hash data pair comprising the sequence address ("00") and a portion of the input data byte sequence ("The"); comparing the current hash data pair to a plurality of stored hash data pairs; and detecting a hash collision in response to a mismatch resulting from a comparison of the current hash data pair with the plurality of stored hash data pairs, or the current hash data pair not matching one of the plurality of stored hash data pairs. In an example embodiment, in the last step where there is a mismatch, the data portion of the hash data pair does not match, but the hash address is the same, because it resulted in the same hash.

According to an embodiment of the present disclosure, the first-f bits (f<=8*q) of the hashed data sequence are stored along with data address in the hash table. In an embodiment, a compare engine then compares these f-bits from the hash table with the first f-bits of the current data string. If the first f-bits do not match, then the compare engine determines that this was caused by a hash collision. This significantly reduces the number of throw-away comparisons caused by hash collisions.

In an embodiment, the present disclosure provides another method that builds on the method described in relation to FIG. 1 and FIG. 2 and compares a current hash data pair with stored hash data pairs. In this embodiment, the method obtains a hash data pair, without necessarily including an active step of hashing, though the active step of hashing is optionally a part of this method. Described in relation to the example embodiment of FIG. 2, the processor-implemented method of detecting hash collisions for data compression in hardware according to this other embodiment of the present disclosure comprises: obtaining a current hash data pair associated with a hash address corresponding to a hash value ("289"), the hash value produced by hashing an input data byte sequence, the current hash data pair comprising: a sequence address ("00") of the input data byte sequence, and a portion of the input data byte sequence ("The"); comparing the current hash data pair to a plurality of stored hash data pairs; and detecting a hash collision in response to a mismatch resulting from a comparison of the current hash data pair with the plurality of stored hash data pairs, or the current hash data pair not matching one of the plurality of stored hash data pairs.

Figure 3:
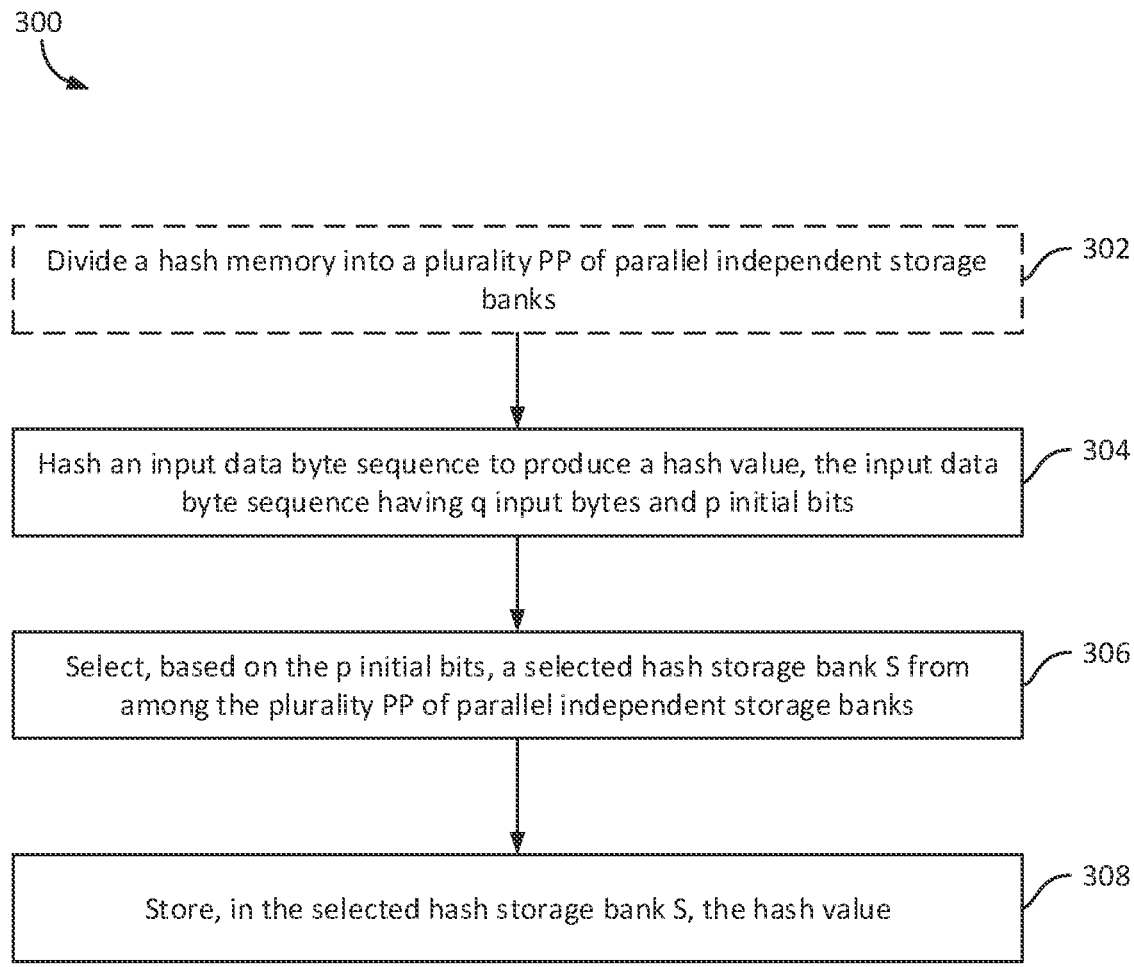
FIG. 3 is a flowchart illustrating a processor-implemented method of mitigating effects of hash collisions in hardware data compression according to another embodiment of the present disclosure.

FIG. 3 is a flowchart illustrating a processor-implemented method 300 of mitigating effects of hash collisions in hardware data compression according to another embodiment of the present disclosure. In the example embodiment described in relation to FIG. 3, parallel hash banks are employed, and a method determines which bank to use based on the first bits of the first bytes of the input data byte sequence. Example embodiments comprise accessing the proper one of the parallel hash banks based on the first few bits of input data byte sequence.

A bottleneck in hardware implementation of a hashing scheme is the hash-memory access bandwidth. The hash memory is accessed for writing in the new entries at hash addresses and reading out entries when looking for matches. Address collisions are common in accessing the memory contents which result in throughput reduction. Embodiments of the present disclosure divide, or break up, the hash storage into PP parallel independent banks, where PP is a power of 2, e.g. $PP=2^p$. In an example embodiment, after generating a hash for a sequence of q input bytes, p bits of the first bytes are used to determine which hash bank will be used to store the entry. Similarly, when looking for occurrences of a data sequence, the same p bits of the first byte of the sequence may be used to determine which hash bank will be used. This way, hash memory accesses are distributed among different banks to increase the throughput.

In an aspect as shown in the embodiment of FIG. 3, the present disclosure provides a processor-implemented method 300 of mitigating effects of hash congestion in hardware data compression. While a hash collision involves generating the exact same hash value, hash congestion is a situation where many hash values are located near each other. In a hash congestion situation, memory access becomes a bottleneck, and it is desirable to increase memory access speed. The method optionally includes, at 302, dividing a hash memory into a plurality PP of parallel independent storage banks. In an alternative embodiment, the hash memory is divided into parallel independent storage banks by some other means, or prior to performing the method. At 304, the method comprises hashing an input data byte sequence to produce a hash value. In an embodiment, the input data byte sequence includes q input bytes and p initial bits. At 306, the method comprises selecting, based on the p initial bits, a selected hash storage bank from among a plurality of hash storage banks. At 308, the method comprises storing, in the selected hash storage bank, the hash value.

In a similar aspect, the hash storage is divided up, and the method assigns one of the parallel hash banks based on the first few bits. In an example embodiment, the present disclosure provides a method of mitigating effects of hash congestion in hardware data compression, comprising: dividing a hash memory into a plurality PP of parallel independent storage banks; hashing an input data byte sequence to produce a hash value, the input data byte sequence having q input bytes and p initial bits; selecting, based on the p initial bits, a selected hash storage bank S from among the plurality PP of parallel independent storage banks; and storing, in the selected hash storage bank S, the hash value.

In an example embodiment in which contents of the initial bits are used to assign a storage bank, the method further comprises: selecting the selected hash storage bank S based on contents of the p initial bits. For example, based on reviewing the first 4 bits, the method may assign hashes associated with data byte sequences beginning with the character "C" (ASCII code 0x43) to storage bank 3 (based on the first, or right-most, bit in the ASCII code), and may assign hashes associated with data byte sequences beginning with the character "X" (ASCII code 0x58) to storage bank 8.

In an example embodiment in which the same method is used for dictionary lookups, the method further comprises: using the p initial bits of the first byte of the input data byte sequence to determine which of the plurality PP of parallel independent storage banks will be used for looking for occurrences of a data sequence in a dictionary lookup.

Figure 4:
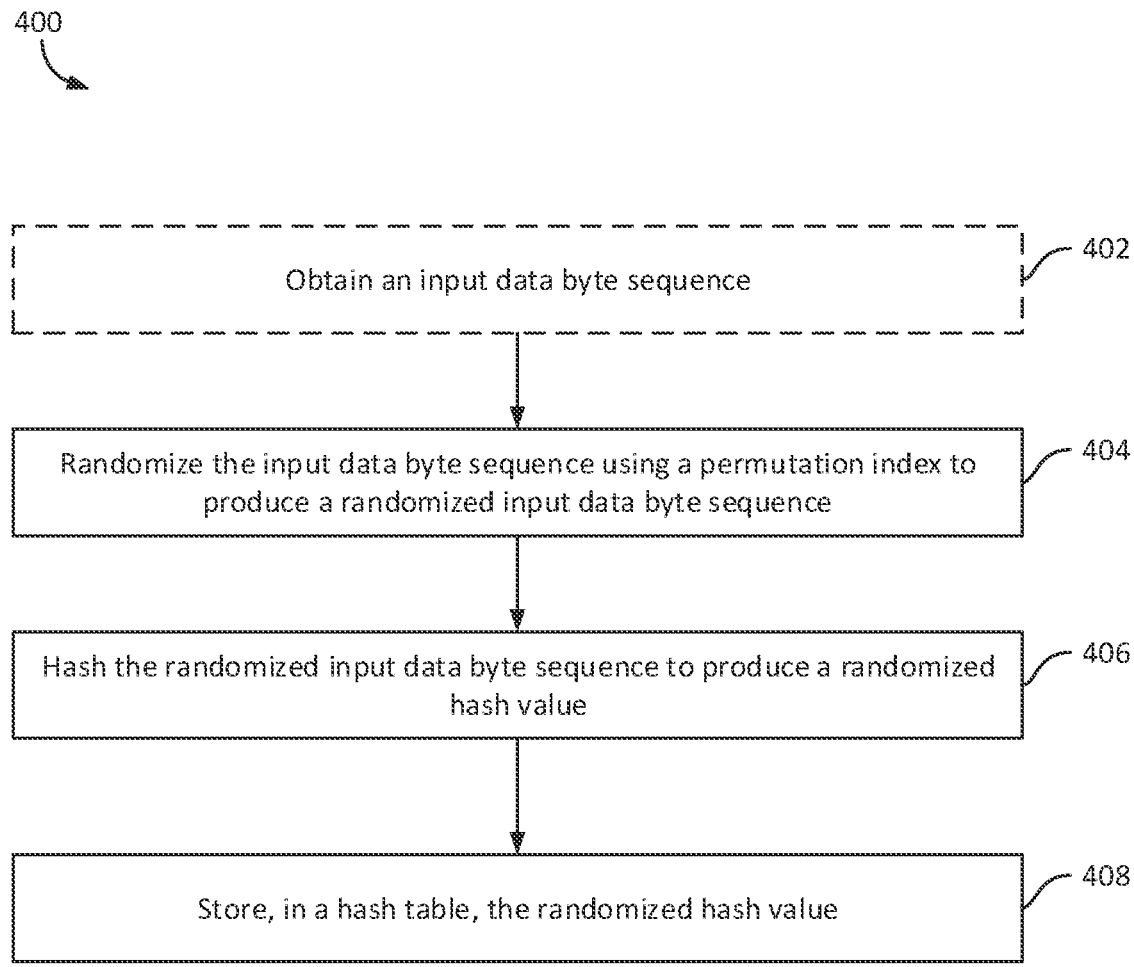
FIG. 4 is a flowchart illustrating a processor-implemented method of mitigating effects of hash collisions in hardware data compression according to a further embodiment of the present disclosure.

FIG. 4 is a flowchart illustrating a processor-implemented method 400 of mitigating effects of hash collisions in hardware data compression according to a further embodiment of the present disclosure. In an example embodiment, the hardware comprises a field programmable gate array (FPGA) or an application-specific integrated circuit (ASIC). In the example embodiment described in relation to FIG. 4, the compression method includes randomization to assist in avoiding hash collisions, or in mitigating effects of hash collisions.

Typically, a hash table is not cleared in between compression jobs or operations. Not clearing a hash table can slow down the compression due to expired hits, also referred to as ghost matches, coming from previous jobs or operations. Embodiments of the present disclosure use character mapping, or character hopping, to combat ghost matches. Similar to how frequency hopping spreads signals over a set of frequencies, character mapping (or character hopping) spreads signals over a set of characters, or modifies how the signals are mapped to certain characters.

In an example embodiment, the 256 possible values in input bytes are mapped to a random permutation of all possible 256 values. In an example implementation, the random permutation changes between subsequent compression jobs or operations (e.g. separate input files). In an example embodiment, the same random permutation is maintained for a complete compression job (which may include a plurality of compression operations), and a different random permutation is generated for a subsequent compression job. This way, data sequences are far less likely to cause ghost matches between jobs even when the exact same data is compressed twice. Embodiments of the present disclosure can be described as providing character mapping, or character hopping, to randomize the data by using a different random character map, compared to the previous memory contents to which a different mapping or no mapping may have been applied. In an example embodiment, the character mapping is modified each time a file goes through the hardware, or for each compression job, to combat ghost matches.

The embodiment shown in FIG. 4 illustrates a processor-implemented method 400 of mitigating effects of hash collisions, or reducing the impact of false hash matches between different input files, in hardware data compression. At 402, the method optionally includes obtaining an input data byte sequence. In an alternate embodiment, the input data byte sequence is obtained by some other means, for example based on previous operations or processing. At 404, the method includes randomizing the input data byte sequence using a permutation index to produce a randomized input data byte sequence. At 406, the method includes hashing the randomized input data byte sequence to produce a randomized hash value. At 408, the method includes storing, in a hash table, the randomized hash value.

In the example embodiment of FIG. 4, the randomization of the input data byte sequence is performed prior to hashing. In another example embodiment, the randomizing is performed after hashing, and before storing the data in the hash table. In such an example embodiment, the present disclosure provides a method of mitigating effects of hash collisions between subsequent jobs in data compression in hardware, comprising: hashing an input data byte sequence to produce a hash value; randomizing the hash value using a permutation index to produce a randomized hash value different from a previous permutation index of a previous job; and storing, in a hash table, the randomized hash value.

In an example embodiment, the permutation index comprises a current permutation index, and the method further comprises: randomizing the hash value using the current permutation index. The current permutation index is different from a previous permutation index that was used in a preceding compression job, for example, on a different file. In this way, the method ensures that a different value of the permutation index is used compared to the value that was used in randomizing the previous operation.

In an example embodiment, the randomized hash value is stored in the hash table without, or in the absence of, clearing the hash table prior to the hashing. While clearing or resetting a memory in a central processing unit (CPU) is common using, for example, a memory copy function, such approaches are costly for a field programmable gate array (FPGA) or other hardware used for hardware data compression.

In an example embodiment, the permutation index comprises a simple shifting or shuffling of the data, for example shifting or shuffling by 1 bit, or by 1 character, or by multiple characters.

Figure 5:
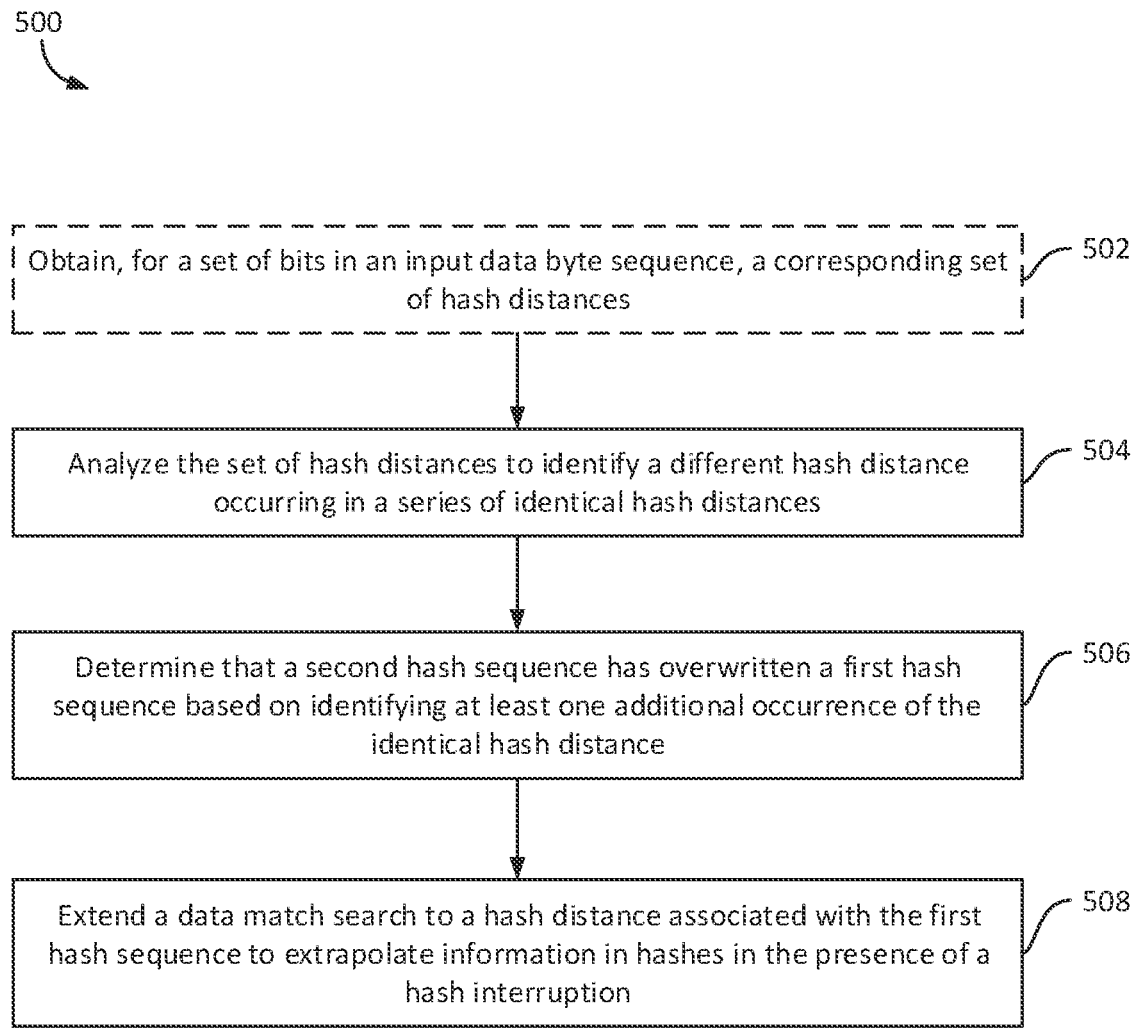
FIG. 5 is a flowchart illustrating a processor-implemented method of mitigating effects of hash collisions in hardware data compression according to another embodiment of the present disclosure.
Figure 6A:
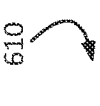
FIG. 6A and FIG. 6B illustrate example input data byte sequences and associated operations relating to the embodiment illustrated in FIG. 5.
Figure 6B:

FIG. 5 is a flowchart illustrating a processor-implemented method of mitigating effects of hash collisions in hardware data compression according to another embodiment of the present disclosure. FIG. 6A illustrates an example input data byte sequence 610 and associated operations relating to the embodiment illustrated in FIG. 5. FIG. 6B illustrates an example input data byte sequence 620 and associated operations relating to the embodiment illustrated in FIG. 5.

FIG. 5, FIG. 6A and FIG. 6B relate to an embodiment that seeks to improve the compression ratio by virtually extending the hash depth. Sequences of data always create linked hash sequences. A newer (e.g. more recent) data sequence can overwrite existing (e.g. older) hash values, breaking the existing chains of hash links. Embodiments of the present disclosure virtually extend the hash depth by extending the data match search around broken hash links, going backward in the data sequence. In an embodiment, this method extrapolates the information in hashes in the presence of hash interruptions, in effect increasing the hash chain depth.

The embodiment shown in FIG. 5 illustrates a processor-implemented method 500 of performing a hash lookup for data compression in hardware. In optional step 502, the method includes obtaining, for a set of bytes in an input data byte sequence, a corresponding set of hash distances. In another implementation, the set of hash distances for the set of bytes in the input data byte sequence may be obtained by some other means, for example based on previous operations or processing.

In the example embodiment shown in FIG. 6A, the set of hash distances comprises: 97-97-97-51-51-51-. . . -97-97. A known method would typically go back 97 locations for those matches, and go back a distance of 51 for those matches. However, even though "hello" is found when going back a distance of 51, there may actually be a better match for those bits associated with a distance of 51, and this is seen in FIG. 6A where "oh hello dude" going back a distance of 97 provides a better match for this entire text string, rather than only going back a distance of 51 for the partial match of "hello". A method according to an embodiment of the present disclosure identifies a potentially "chopped off" previous match, due to a change in hash contents in the memory, and searches for a better match. In the example embodiment shown in FIG. 6B, the set of hash distances comprises: 71-71-20-71-71-71-50-71.

Referring back to FIG. 5 at 504, the method includes analyzing the set of hash distances to identify a different hash distance occurring in a series of identical hash distances. Referring to FIG. 6A, the hash distance "51" is a different hash distance that occurs before a series of identical hash distances, namely the second set of "97-97". Referring to FIG. 6B, the hash distance "20" is a different hash distance that occurs before a series of identical hash distances, namely "71". In an alternate embodiment, the method includes analyzing the set of hash distances to identify a different hash distance occurring between or after a series of identical hash distances. For example, in FIG. 6B the hash distance "50" is found after a series of identical hash distances 71, and before the same hash distance 71. Referring again to FIG. 6B, the method determines that a previous hash sequence was "chopped" by a different match at 20 and at 50, and looks into the match length at 71, at 20 and at 50.

Referring back to FIG. 5, at 506 the method includes determining that a second hash sequence has overwritten a first hash sequence based on identifying at least one additional occurrence of the identical hash distance. In the example of FIG. 6A, the method can identify at least one additional occurrence of "97" before the different hash distance "51" as well as before the different hash distance "51". Similarly in the example of FIG. 6B, the method can identify at least one additional occurrence of "71" before the different hash distance "20" as well as before the different hash distance "50".

Referring back to FIG. 5, at 508, the method includes extending a data match search to a hash distance associated with the first hash sequence to extrapolate information in hashes in the presence of a hash chain interruption. In the example of FIG. 6A, the method extends the data match search to the hash distance of 97 (in addition to 51) associated with the first hash sequence distance to extrapolate information in hashes in the presence of the hash interruption. In the example of FIG. 6B, the method extends the data match search to the hash distance of 20, or the hash distance of 50, or both, with those hash distances being associated with second and third hash distances to extrapolate information in hashes in the presence of the hash interruption. As shown in FIG. 6B, the method may look into the match length at hash distances of one or more of: 71, 20 and 50.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a compact disk read only memory (CD-ROM), digital versatile disk (DVD), Blu-ray Disc Read Only Memory (BD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

Embodiments of the disclosure can be described with reference to the following Example Embodiments, with specific features laid out in the dependent clauses.

Example embodiment 1: A processor-implemented method of mitigating effects of hash collisions in hardware data compression, comprising: hashing an input data byte sequence to produce a hash value, the input data byte sequence being located at a sequence address within an input data stream; and storing, in a hash table at a hash address corresponding to the hash value, the sequence address and a portion of the input data byte sequence.

Example embodiment 2: The method of example embodiment 1 wherein the hardware has a memory width and a memory depth, and wherein the method further comprises: storing the hash value in the hardware so as to add content in the memory depth; and storing the portion of the input data byte sequence in the hardware so as to add content in the memory width.

Example embodiment 3: The method of example embodiment 2 wherein the memory width includes an addressing width used with respect to addressing a window size for dictionary based compression, and wherein the method further comprises: storing the portion of the input data byte sequence in an unused section of the memory width, the unused section defined by the memory width minus the addressing width.

Example embodiment 4: The method of example embodiment 3 wherein: the portion of the input data byte sequence has a maximum length equal to a width of the unused section of the memory width.

Example embodiment 5: The method of example embodiment 1 wherein: the portion of the input data byte sequence has a minimum length of 1 bit.

Example embodiment 6: A processor-implemented method of detecting hash collisions for data compression in hardware, comprising: hashing an input data byte sequence to produce a hash value, the input data byte sequence being located at a sequence address within an input data stream; storing, in a hash table at a hash address corresponding to the hash value, a current hash data pair comprising the sequence address and a portion of the input data byte sequence; comparing the current hash data pair to a plurality of stored hash data pairs; and detecting a hash collision in response to a mismatch resulting from a comparison of the current hash data pair with the plurality of stored hash data pairs.

Example embodiment 7: A processor-implemented method of detecting hash collisions for data compression in hardware, comprising: obtaining a current hash data pair associated with a hash address corresponding to a hash value, the hash value produced by hashing an input data byte sequence, the current hash data pair comprising i) a sequence address of the input data byte sequence; and ii) a portion of the input data byte sequence; comparing the current hash data pair to a plurality of stored hash data pairs; and detecting a hash collision in response to a mismatch resulting from a comparison of the current hash data pair with the plurality of stored hash data pairs.

Example embodiment 8: A processor-implemented method of mitigating effects of hash collisions in hardware data compression, comprising: hashing an input data byte sequence to produce a hash value, the input data byte sequence having q input bytes and p initial bits; selecting, based on the p initial bits, a selected hash storage bank from among a plurality of hash storage banks; and storing, in the selected hash storage bank, the hash value.

Example embodiment 9: A processor-implemented method of mitigating effects of hash congestion in hardware data compression, comprising: dividing a hash memory into a plurality PP of parallel independent storage banks; hashing an input data byte sequence to produce a hash value, the input data byte sequence having q input bytes and p initial bits; selecting, based on the p initial bits, a selected hash storage bank S from among the plurality PP of parallel independent storage banks; and storing, in the selected hash storage bank S, the hash value.

Example embodiment 10: The method of example embodiment 8 or 9 further comprising: selecting the selected hash storage bank S based on contents of the p initial bits.

Example embodiment 11: The method of example embodiment 9 further comprising: using the p initial bits of the first byte of the input data byte sequence to determine which of the plurality PP of parallel independent storage banks will be used for looking for occurrences of a data sequence in a dictionary lookup.

Example embodiment 12: A processor-implemented method of mitigating effects of hash congestion in hardware data compression, comprising: obtaining an input data byte sequence; randomizing the input data byte sequence using a permutation index to produce a randomized input data byte sequence; hashing the randomized input data byte sequence to produce a randomized hash value; and storing, in a hash table, the randomized hash value.

Example embodiment 13: A processor-implemented method of mitigating effects of hash collisions in hardware data compression, comprising: hashing an input data byte sequence to produce a hash value; randomizing the hash value using a permutation index different from a previous permutation index to produce a randomized hash value; and storing, in a hash table, the randomized hash value.

Example embodiment 14: The method of example embodiment 12 or 13 wherein the hardware comprises a field programmable gate array (FPGA) or application-specific integrated circuit (ASIC).

Example embodiment 15: The method of example embodiment 12 or 13 wherein the permutation index comprises a current permutation index, and further comprising: randomizing the hash value using the current permutation index, the current permutation index being different from a previous permutation index used in a preceding compression job.

Example embodiment 16: The method of example embodiment 12 or 13 wherein the randomized hash value is stored in the hash table in the absence of clearing the hash table prior to the hashing.

Example embodiment 17: A processor-implemented method of performing a hash lookup for data compression in hardware, comprising: obtaining, for a set of bits in an input data byte sequence, a corresponding set of hash distances; analyzing the set of hash distances to identify an different hash distance occurring in a series of identical hash distances; determining that a second hash sequence has overwritten a first hash sequence based on identifying at least one additional occurrence of the identical hash distance before the different hash distance; and extending a data match search to a hash distance associated with the first hash sequence to extrapolate information in hashes in the presence of a hash interruption.

Example embodiment 18: A system for mitigating effects of hash collisions in hardware data compression, comprising: a non-transient computer-readable storage medium having executable instructions embodied thereon; and one or more hardware processors configured to execute the instructions to perform the method of any one of example embodiments 1 to 17.

Example embodiment 19: A non-transient computer-readable storage medium having instructions embodied thereon, the instructions being executable by one or more processors to perform a method according to any one of example embodiments 1 to 17.

What is claimed is:

1. A processor-implemented method of mitigating effects of hash collisions in hardware data compression, comprising:
hashing an input data byte sequence to produce a hash value, the input data byte sequence being located at a sequence address within an input data stream; and
storing, in a hash table at a hash address corresponding to the hash value, the sequence address and a portion of the input data byte sequence.

2. The method of claim 1 wherein the hardware has a memory width and a memory depth, and wherein the method further comprises:
storing the hash value in the hardware so as to add content in the memory depth; and
storing the portion of the input data byte sequence in the hardware so as to add content in the memory width.

3. The method of claim 2 wherein the memory width includes an addressing width used with respect to addressing a window size for dictionary based compression, and wherein the method further comprises:
storing the portion of the input data byte sequence in an unused section of the memory width, the unused section defined by the memory width minus the addressing width.

4. The method of claim 3 wherein:
the portion of the input data byte sequence has a maximum length equal to a width of the unused section of the memory width.

5. The method of claim 1 wherein:
the portion of the input data byte sequence has a minimum length of 1 bit.

6. The method of claim 1 further comprising:
storing, in the hash table at the hash address corresponding to the hash value, a current hash data pair comprising the sequence address and the portion of the input data byte sequence;
comparing the current hash data pair to a plurality of stored hash data pairs; and
detecting a hash collision in response to a mismatch resulting from a comparison of the current hash data pair with the plurality of stored hash data pairs.

7. The method of claim 1 further comprising:
obtaining a current hash data pair associated with the hash address corresponding to the hash value;
comparing the current hash data pair to a plurality of stored hash data pairs; and
detecting a hash collision in response to a mismatch resulting from a comparison of the current hash data pair with the plurality of stored hash data pairs.

8. The method of claim 1 wherein the input data byte sequence has q input bytes and p initial bits, and further comprising:
selecting, based on the p initial bits, a selected hash storage bank from among a plurality of hash storage banks; and
storing, in the selected hash storage bank, the hash value.

9. The method of claim 8 further comprising:
selecting the selected hash storage bank based on contents of the p initial bits.

10. The method of claim 1 wherein the input data byte sequence has q input bytes and p initial bits, and further comprising:
dividing a hash memory into a plurality PP of parallel independent storage banks;
selecting, based on the p initial bits, a selected hash storage bank S from among the plurality PP of parallel independent storage banks; and
storing, in the selected hash storage bank S, the hash value.

11. The method of claim 10 further comprising:
using the p initial bits of the first byte of the input data byte sequence to determine which of the plurality PP of parallel independent storage banks will be used for looking for occurrences of a data sequence in a dictionary lookup.

12. The method of claim 1 further comprising:
obtaining the input data byte sequence prior to hashing the input data byte sequence;
randomizing the input data byte sequence using a permutation index to produce a randomized input data byte sequence;
hashing the randomized input data byte sequence to produce a randomized hash value; and
storing, in the hash table, the randomized hash value.

13. The method of claim 12 wherein the hardware comprises a field programmable gate array (FPGA) or application-specific integrated circuit (ASIC).

14. The method of claim 12 wherein the permutation index comprises a current permutation index, and further comprising:
randomizing the hash value using the current permutation index, the current permutation index being different from a previous permutation index used in a preceding compression job.

15. The method of claim 12 wherein the randomized hash value is stored in the hash table in the absence of clearing the hash table prior to the hashing.

16. The method of claim 1 further comprising:
randomizing the hash value using a permutation index different from a previous permutation index to produce a randomized hash value; and
storing, in the hash table, the randomized hash value.

17. The method of claim 1 further comprising:
obtaining, for a set of bits in the input data byte sequence, a corresponding set of hash distances;
analyzing the set of hash distances to identify a different hash distance occurring in a series of identical hash distances;
determining that a second hash sequence has overwritten a first hash sequence based on identifying at least one additional occurrence of the identical hash distance before the different hash distance; and
extending a data match search to a hash distance associated with the first hash sequence to extrapolate information in hashes in the presence of a hash interruption.

18. A system for mitigating effects of hash collisions in hardware data compression, comprising:
a non-transient computer-readable storage medium having executable instructions embodied thereon; and
one or more hardware processors configured to execute the instructions to:
hash an input data byte sequence to produce a hash value, the input data byte sequence being located at a sequence address within an input data stream; and
store, in a hash table at a hash address corresponding to the hash value, the sequence address and a portion of the input data byte sequence.

19. A non-transient computer-readable storage medium having instructions embodied thereon, the instructions being executable by one or more processors to perform a method of mitigating effects of hash collisions in hardware data compression, comprising:
hashing an input data byte sequence to produce a hash value, the input data byte sequence being located at a sequence address within an input data stream; and
storing, in a hash table at a hash address corresponding to the hash value, the sequence address and a portion of the input data byte sequence.

* * * * *